May 11, 1937.  E. L. ESTEL  2,079,795
SURVEYING INSTRUMENT
Filed May 6, 1936
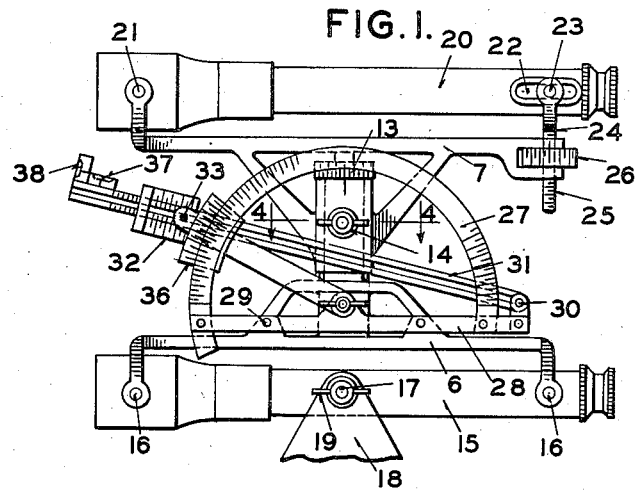
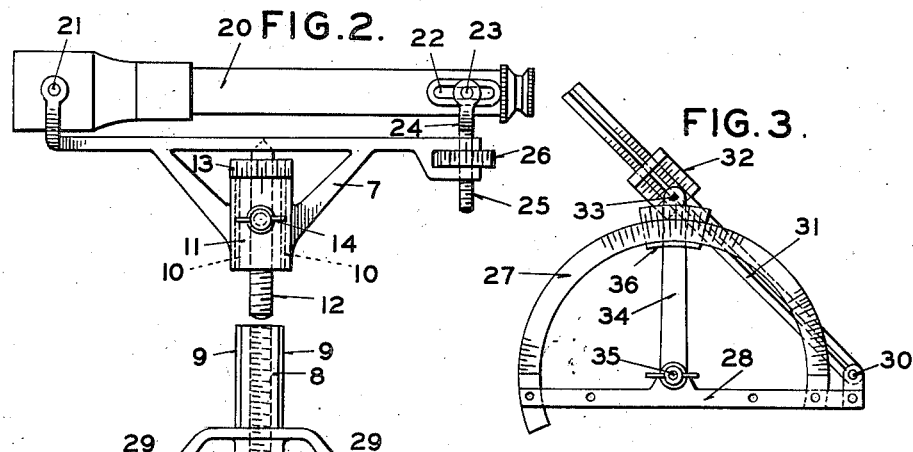
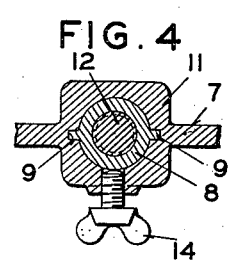
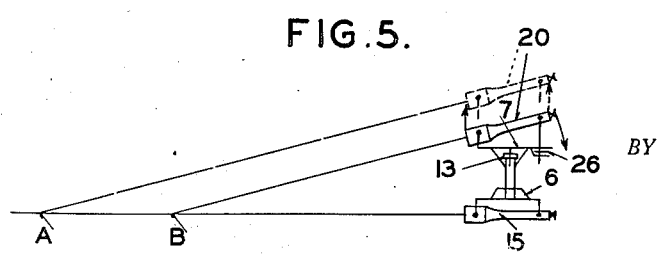
*INVENTOR.*
EDWIN L. ESTEL
BY
*ATTORNEY*

Patented May 11, 1937

2,079,795

UNITED STATES PATENT OFFICE 2,079,795

SURVEYING INSTRUMENT

Edwin L. Estel, St. Louis, Mo.

Application May 6, 1936, Serial No. 78,167

4 Claims. (Cl. 33—65)

My invention relates to a surveying instrument and more particularly to improvements in the type of instrument shown and described in U. S. Patent No. 1,604,398 granted to me October 26, 1926.

The principal object of my invention is to increase the practical range of the instrument by providing means whereby more minute readings may be obtained from the instrument.

In the accompanying drawing, which illustrates one form of surveying instrument made in accordance with my invention, Figure 1 is a side elevation; Figure 2 is a view similar to Figure 1 but showing the limb removed and the two parts of the frame separated; Figure 3 is a detail view of the limb; Figure 4 is a section taken on the line 4—4 of Figure 1; and Figure 5 is a diagram illustrating the operation of the device.

In my prior device, above referred to, the limit of reading is determined by the fineness of graduation which is practicable in the micrometer determining the angle between the telescopes. In accordance with the present invention, I provide means for varying the distance between the telescopes (or other sighting devices) and thus subdividing the minimum readings obtainable by angular movement alone.

The frame of the device comprises a lower part 6 and an upper part 7. The lower part is provided with an internally threaded sleeve 8 having splines 9 engaging with guide ways 10 in hub or boss 11 carried by the upper part 7 of the frame. Passing through the boss 11 is a micrometer screw 12 engaging with the internal threads of the sleeve 8. The upper end of the micrometer screw bears against the cross bar of the part 7 and is provided with a graduated drum 13, the graduations of which are read by comparison with a line or lines on the periphery of the hub. After the proper reading has been secured, the hub and sleeve are clamped together by a set screw 14 to thus prevent relative movement.

The lower sighting device consists of a telescope 15 secured to the part 6 of the frame by being attached thereto at points 16 so as to be in fixed relation thereto with its axis at right angles to the axis of the sleeve 8. To permit the swinging of the frame in a vertical plane, I provide the telescope with trunnions 17 for pivotal mounting in a base 18, which may be of any of the usual forms employed for supporting surveying instruments. A thumb nut 19 serves to lock the telescope and base in any desired adjustment. While I have shown the base pivoted to the telescope for convenience of construction, it is evident that the desired result might be obtained by pivoting it to some other part of the frame.

The upper sighting device consists of a telescope 20 pivoted at 21 to the part 7 of the frame and provided adjacent to its rear end with guide ways 22 which are engaged by pins 23 in the forked end 24 of a micrometer screw 25. The screw is moved to raise or lower the end of the telescope by rotating a graduated drum 26. For convenience in performing the calculations, the pitch of the screw 25 should be the same as that of the screw 12 and the graduations of the drum 26, the same as those of the drum 13 so that like readings may be obtained from the two micrometer devices.

My device employs a limb similar to that described in my patent above referred to but on account of the construction of the frame I prefer to use this limb in conjunction with the lower sighting device. This limb includes a graduated semicircular arc 27 carried by a bar 28 which is detachably secured to the lower part 6 of the frame by pins 29. Pivoted to the bar 28 at point 30 is a graduated arm 31 engaging with a slide 32 preferably provided with a vernier scale for reading the graduations on the bar 31. The slide 32 is pivoted at 33 to an arm 34 which is pivoted at 35 to the arm 28. The distance between points 33 and 35 is equal to that between points 30 and 35 so that the triangle formed between arms 28, 31 and 34 is an isosceles one in all positions of the parts. A scale 36 carried by arm 34 cooperates with the limb to facilitate reading of the scale thereon. On the bar 31 is a leveling device 37 for bringing the arm into horizontal position. I prefer also to provide the bar with a second leveling device 38 for bringing it into vertical position.

The method of finding the distance of an object by means of the limb on the micrometer 26 is the same as with the instrument described in my prior patent above referred to. Referring to the diagram (Figure 5) suppose that the point "A" is found by one setting of the micrometer 26 and that the movement of the said micrometer one graduation shifts the line of sight to the point "B", it will be evident that by the use of the micrometer 26 alone no intermediate reading can be obtained and if the distance "A"—"B" is greater than the degree of accuracy required, satisfactory results cannot be secured in this way. By the use of the micrometer 13 the telescope 20 may be moved from the position shown in full lines to that shown in dotted lines in a direction at right angles to the line of sight of the telescope 15 thus subdividing the distance "A"—"B".

Having fully described my invention, what I claim as new and desire to secure by Letters Patent of the United States is:

1. In a device of the class described, the combination with a two-part frame, of a sighting device carried by one part of said frame in fixed relation thereto, a second sighting device pivoted to the other part of the frame, means including a measuring device for swinging said second named sighting device on its pivot, and means also including a measuring device for moving one part of the frame relative to the other, the calibrations of the two measuring devices being the same.

2. In a device of the class described, the combination with a two-part frame, of a telescope carried in fixed relation to one part of said frame, a second telescope pivotally mounted on the other part of the frame, a micrometer for swinging said telescope on its pivot, and a second micrometer for moving the two parts of the frame toward and away from each other, the calibrations of the two micrometers being the same.

3. In a device of the class described, the combination with a base, of a frame mounted on said base to swing in a vertical plane, said frame being formed of two parts having relative movement, a sighting device mounted in fixed relation to one part of said frame, a second sighting device pivotally carried by the other part of said frame, means including a measuring device for swinging said second named sighting device on its pivot, and means also including a measuring device for moving the two parts of the frame toward and away from each other.

4. In a device of the class described, the combination with a base, of a frame mounted on said base to swing in a vertical plane, said frame being formed of two parts having relative movement, a sighting device mounted in fixed relation to one part of said frame, a second sighting device pivotally carried by the other part of said frame, means including a measuring device for swinging said second named sighting device on its pivot, means also including a measuring device for moving the two parts of the frame toward and away from each other, and a limb cooperating with one of said sighting devices, said limb including a graduated arc, a pivoted arm cooperating with said arc, and a second pivoted arm having sliding engagement with the first named arm and forming an auxiliary sighting device.

EDWIN L. ESTEL.